US010581247B1

(12) United States Patent
Kolhatkar et al.

(10) Patent No.: US 10,581,247 B1
(45) Date of Patent: Mar. 3, 2020

(54) SYSTEM AND METHOD FOR REACTIVE POWER CONTROL OF WIND TURBINES IN A WIND FARM SUPPORTED WITH AUXILIARY REACTIVE POWER COMPENSATION

(71) Applicant: General Electric Company, Schenectady, NY (US)

(72) Inventors: Yashomani Yashodhan Kolhatkar, Bangalore (IN); Olive Ray, Kolkata (IN); Kasi Viswanadha Raju Gadiraju, Bangalore (IN); Arvind Kumar Tiwari, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/403,751

(22) Filed: May 6, 2019

(51) Int. Cl.
*H02J 3/18* (2006.01)
*F03D 7/02* (2006.01)
*H02P 9/00* (2006.01)
*H02J 3/38* (2006.01)

(52) U.S. Cl.
CPC .......... *H02J 3/1842* (2013.01); *F03D 7/0284* (2013.01); *H02J 3/386* (2013.01); *H02P 9/007* (2013.01)

(58) Field of Classification Search
CPC ........ H02M 5/45; H02M 5/451; H02M 5/458; H02J 3/18; H02J 3/1814; H02J 3/1842; H02J 3/386; H02P 9/00; H02P 9/007; H03D 7/02
See application file for complete search history.

(56) References Cited

U.S. PATENT DOCUMENTS

| 904,607 | A | 11/1908 | Elmblad |
| 5,225,712 | A * | 7/1993 | Erdman ............... F03D 7/0272 290/44 |
| 6,924,565 | B2 | 8/2005 | Wilkins et al. |

(Continued)

FOREIGN PATENT DOCUMENTS

| CN | 106451483 A | 2/2017 |
| CN | 106532771 A | 3/2017 |

(Continued)

OTHER PUBLICATIONS

Liu et al., Research on Effects of Wind Turbines Characteristics on Power Grid Stability, 2014 China International Conference on Electricity Distribution (CICED), Conference Location Shenzhen, China, 2014, pp. 637-639.

(Continued)

*Primary Examiner* — Matthew V Nguyen
(74) *Attorney, Agent, or Firm* — Dority & Manning, P.A.

(57) ABSTRACT

A method and associated system for operating a power generation to supply real and reactive power to a grid includes determining a total reactive power demand made on the system during a first, stable grid state. A first reactive power portion of the reactive power demand is supplied by a generator, and a second reactive power portion is supplied by a reactive power compensation device, wherein the second reactive power portion may be greater than the first reactive power portion. Upon detection of a grid fault, the first reactive power portion is increased and the second reactive power portion is decreased.

19 Claims, 7 Drawing Sheets

(56) References Cited

U.S. PATENT DOCUMENTS

| | | | |
|---|---|---|---|
| 7,013,203 B2 | 3/2006 | Moore et al. | |
| 7,071,579 B2 | 7/2006 | Erdman et al. | |
| 7,095,597 B1 | 8/2006 | Cousineau | |
| 7,119,452 B2 | 10/2006 | Larsen | |
| 7,166,928 B2 | 1/2007 | Larsen | |
| 7,245,037 B2 | 7/2007 | Angquist et al. | |
| 7,567,160 B2 | 7/2009 | Folts et al. | |
| 7,923,862 B2 | 4/2011 | Cardinal et al. | |
| 8,653,685 B2 | 2/2014 | Garcia | |
| 8,664,800 B2 | 3/2014 | Galbraith et al. | |
| 8,847,562 B2 | 9/2014 | Agudo Araque | |
| 9,214,883 B2 | 12/2015 | Kim et al. | |
| 9,236,742 B2 | 1/2016 | Garcia | |
| 9,366,233 B2 | 6/2016 | Bech et al. | |
| 9,407,186 B2 | 8/2016 | Babazadeh et al. | |
| 9,419,439 B2 | 8/2016 | Nielsen | |
| 9,556,852 B2 | 1/2017 | Babazadeh et al. | |
| 9,556,853 B2 | 1/2017 | Gupta et al. | |
| 9,660,448 B2 | 5/2017 | Ellena et al. | |
| 2013/0154614 A1* | 6/2013 | Gadiraju | H02J 3/00 324/103 R |
| 2014/0175887 A1 | 6/2014 | Shao et al. | |
| 2016/0268940 A1 | 9/2016 | Achilles et al. | |
| 2017/0025858 A1 | 1/2017 | Garcia et al. | |
| 2017/0025859 A1 | 1/2017 | Garcia et al. | |
| 2018/0076622 A1* | 3/2018 | Wilkins | H02J 3/16 |
| 2019/0203693 A1* | 7/2019 | Tiwari | F03D 7/0272 |

FOREIGN PATENT DOCUMENTS

| | | | |
|---|---|---|---|
| CN | 107240930 A | 10/2017 | |
| EP | 1508951 A1 * | 2/2005 | F03D 7/02 |
| EP | 1919076 A2 * | 5/2008 | H02J 3/1871 |
| WO | WO2014/044007 A1 | 3/2014 | |

OTHER PUBLICATIONS

Ling et al., Dynamic Reactive Power Compensation During Fault Conditions for Wind Farms with the Consideration of Wind Turbine Protection Effects, International Conference on Sustainable Power Generation and Supply (SUPERGEN 2012), Hangzhou, China, 2012, 5 Pages.

* cited by examiner

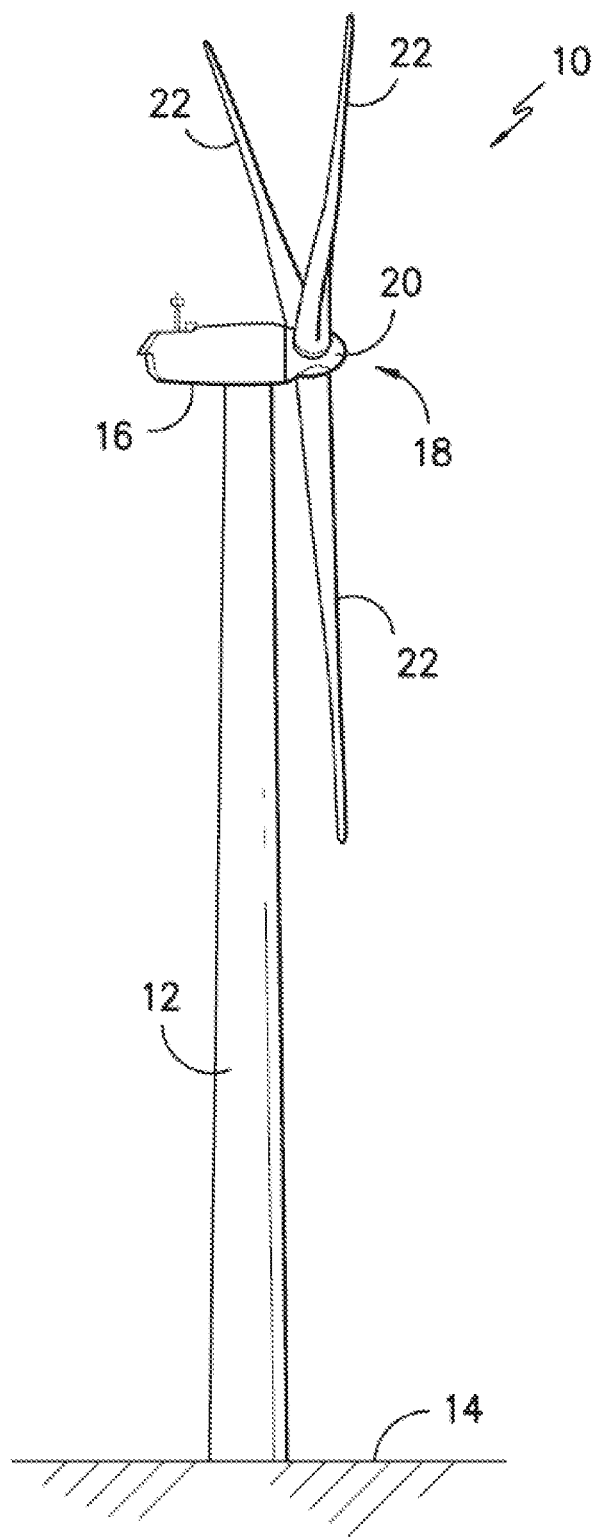
FIG. -1-

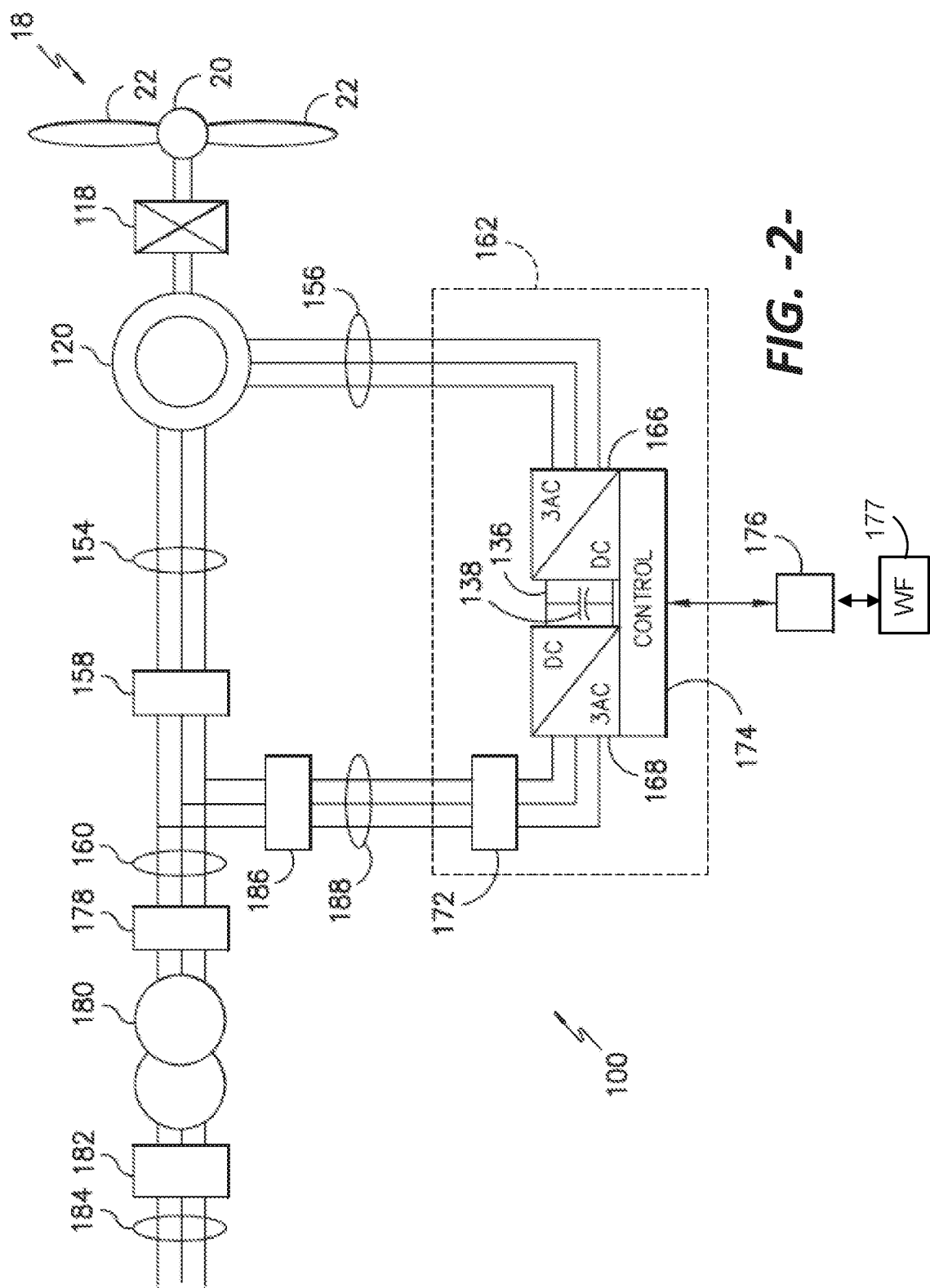
FIG. -2-

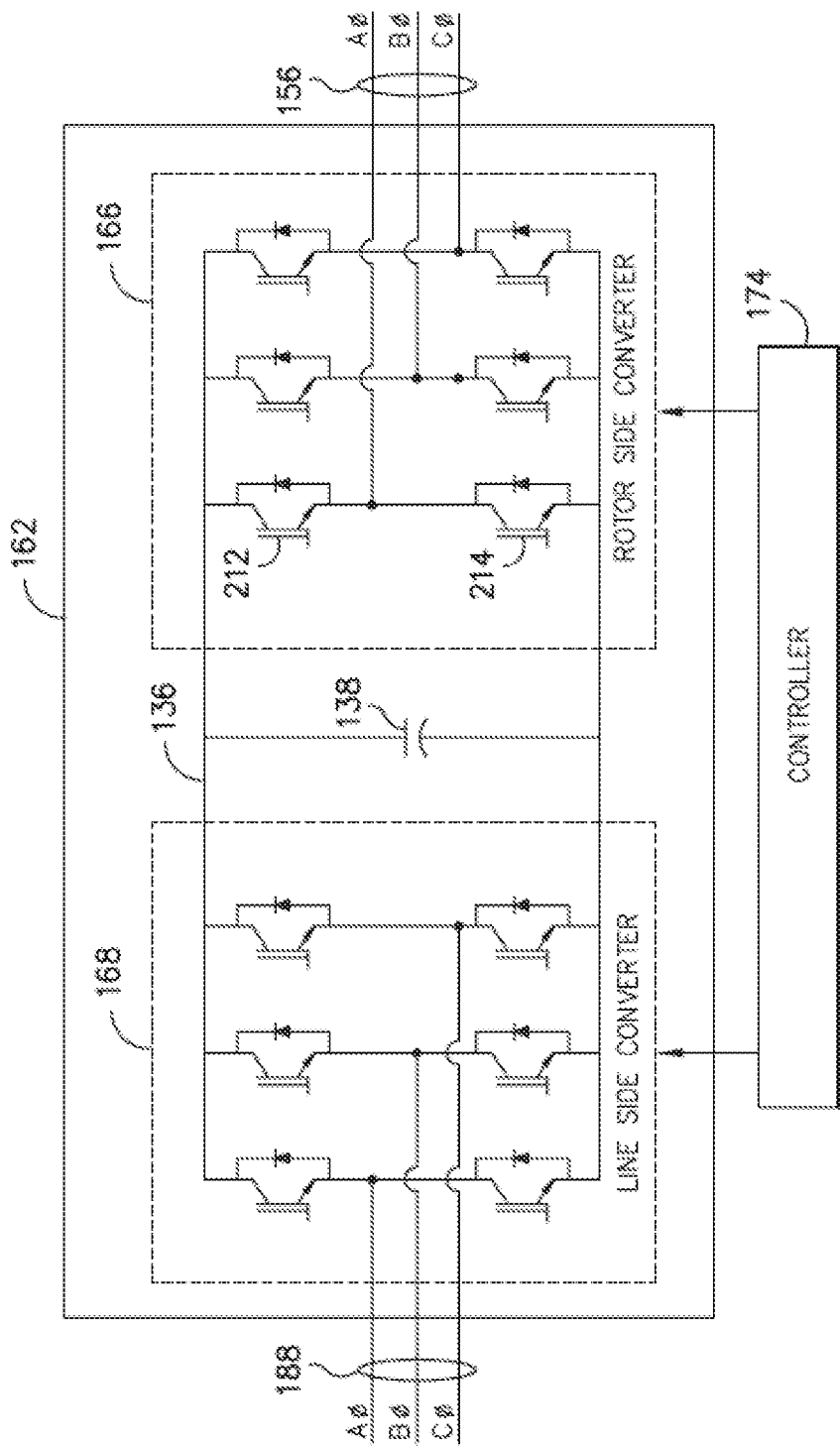
FIG. -3-

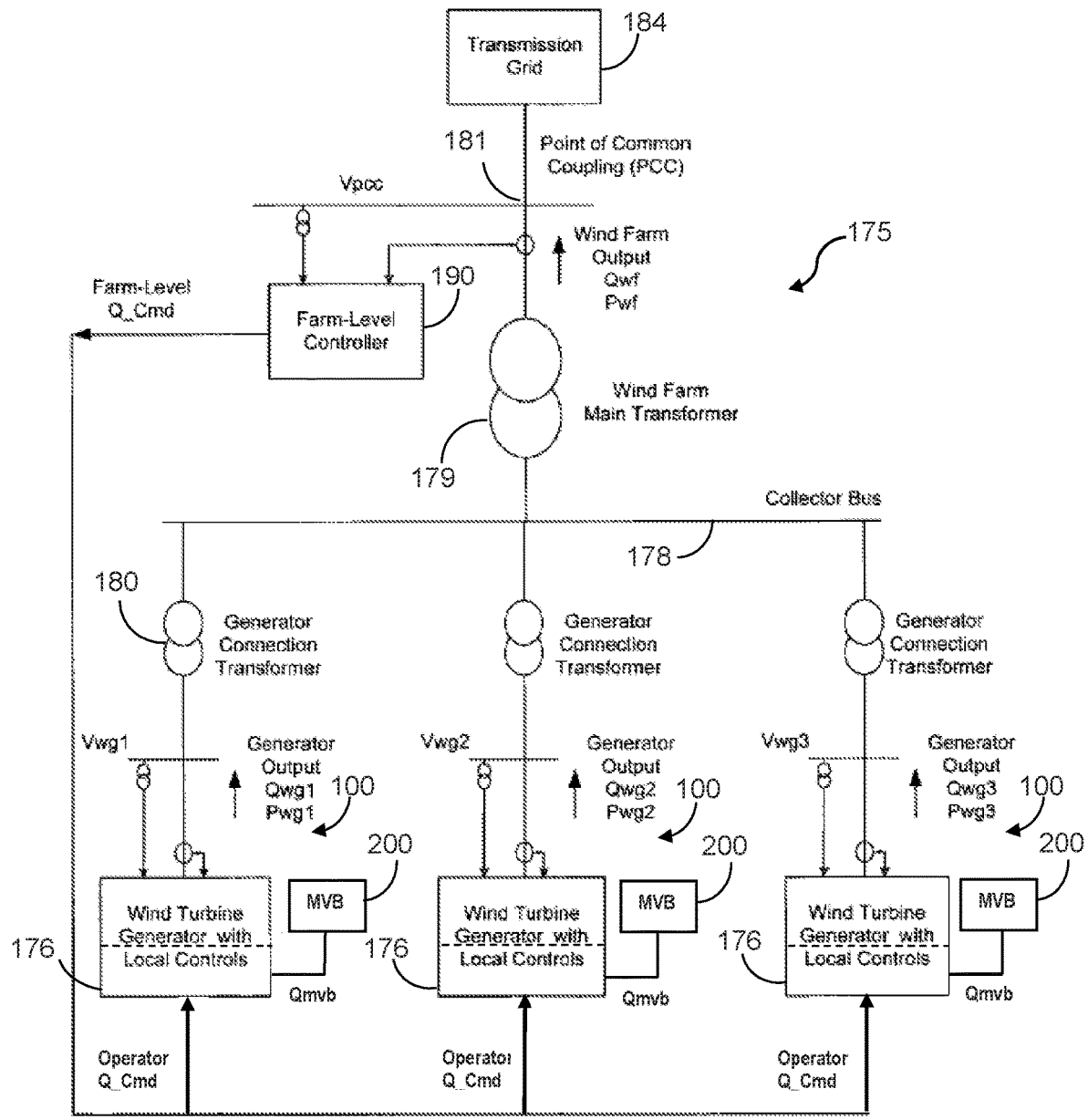
FIG. -4-

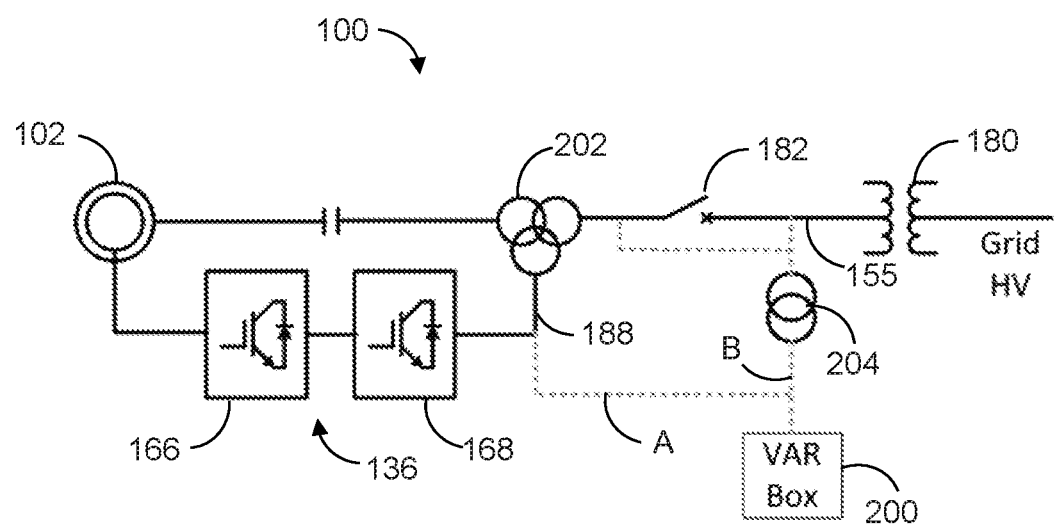
FIG. -5-

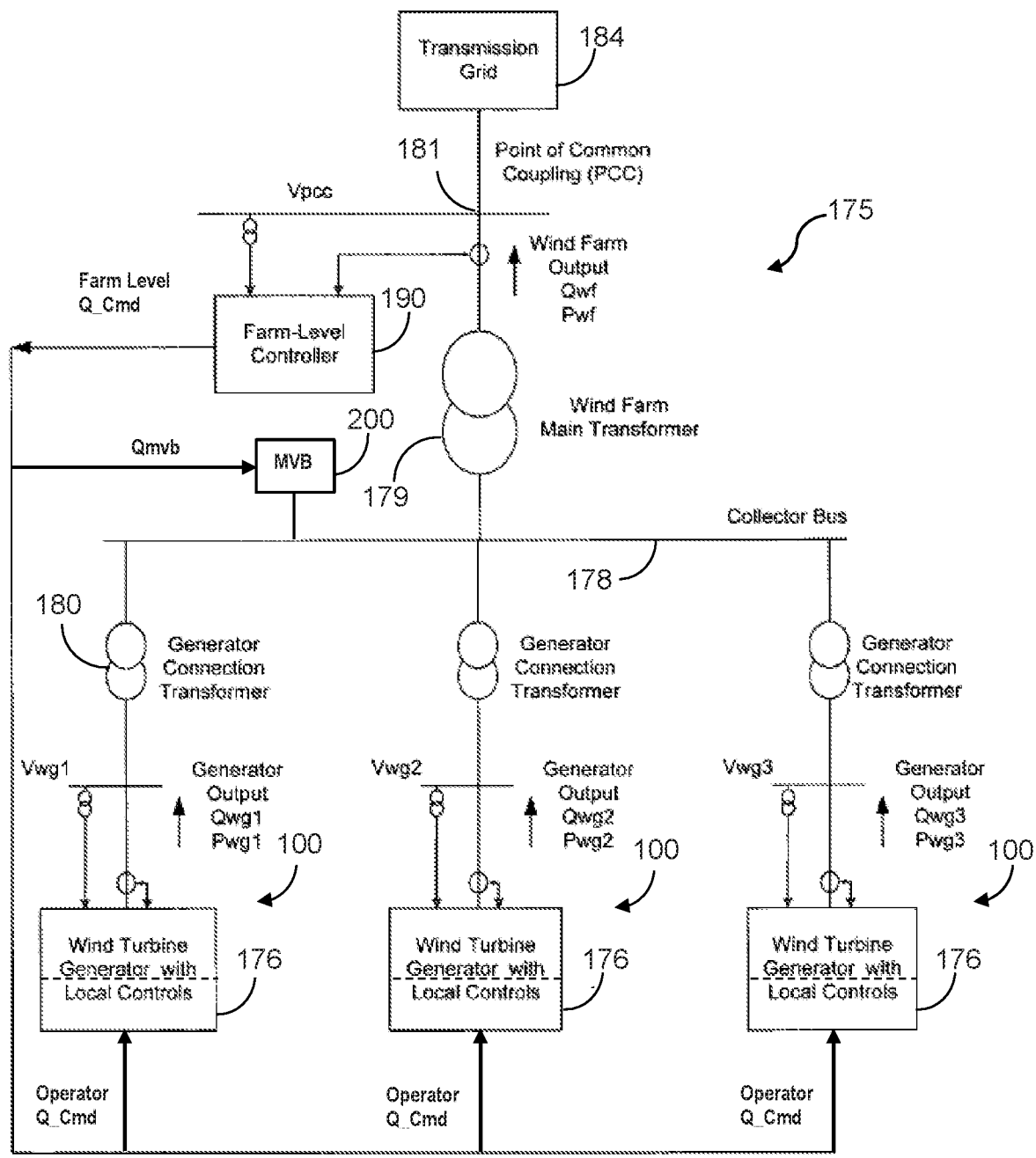
FIG. -6-

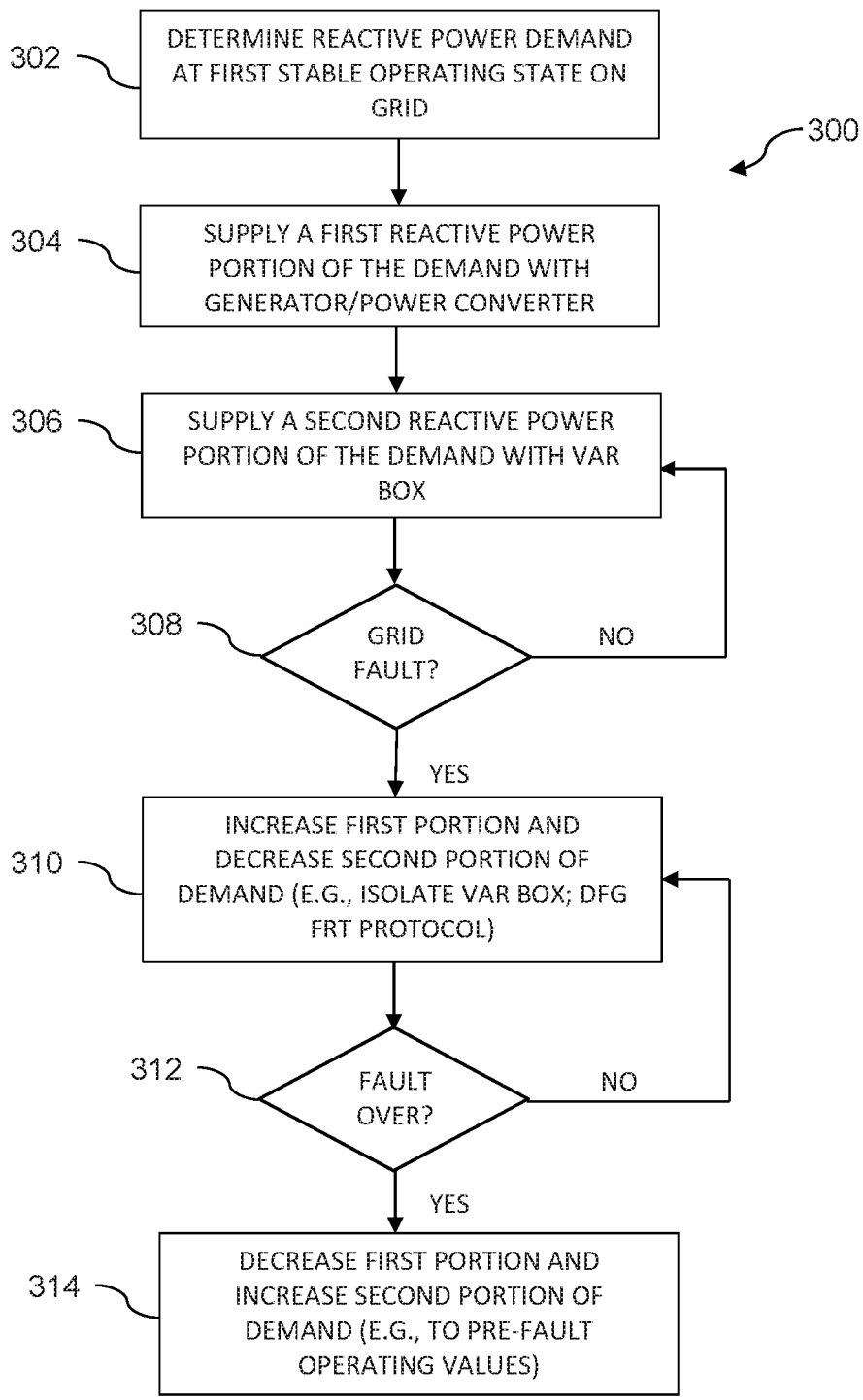
FIG. -7-

SYSTEM AND METHOD FOR REACTIVE POWER CONTROL OF WIND TURBINES IN A WIND FARM SUPPORTED WITH AUXILIARY REACTIVE POWER COMPENSATION

FIELD

The present disclosure relates generally to wind turbines and, more particularly, to a system and method of reactive power control of wind turbines in a wind farm, wherein the wind farm or the individual wind turbines are augmented with an auxiliary reactive power source.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient states is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

Integration of wind energy into traditional power grids generally requires that the wind turbines are equipped with "Fault Ride Through" (FRT) capability, such as Low Voltage Ride Through (LVRT) capability that requires the wind turbines to remain connected to the grid for a predetermined time period during grid voltage drops or sags. This requirement is intended to prevent the wind turbines from dropping off of the grid collector bus and causing further grid instability during the fault state. The grid requirements also generally dictate that, during the fault state, the wind turbines supply reactive power to the grid to regulate and stabilize grid voltage as a function of the magnitude of the grid voltage drop. When the fault state is over, the wind turbines must quickly resupply active power to the grid.

For DFIG systems in particular, when a grid fault occurs (e.g., voltage drop), the DFIG needs to supply reactive power to the grid, which results in the strengthening of the grid voltage, which places even more of a burden on the FRT capability of the DFIG system.

To address the above FRT situations, it has been proposed to augment the reactive power capability of the wind farm during an FRT event with reactive power compensation devices. Reference is made, for example, to the paper "*Dynamic Reactive Power Compensation During Fault States for Wind Farms with the Consideration of Wind Turbine Protection Effects*" presented at the International Conference on Sustainable Power Generation and Supply, China, 2012. This paper discusses the use of reactive power compensation devices, such as a SVC, during grid fault states, such as grid voltage sag. Similarly, the paper "*Research on Effects of Wind Turbines Characteristics on Power Grid Stability*" presented at the China International Conference on Electricity Distribution (CICED 2014), China, 2014, discusses configuring SVC and SVG devices at the export location of wind turbines to provide reactive power compensation during grid power failures.

US Patent Application Pub. No. 2017/0025858 describes a wind power plant connected to an electrical grid, the power plant including a plurality of wind turbine generators and a Static Synchronous Compensator (STATCOM) device. In a first control mode, the wind turbine generators and STATCOM are operated in master-slave relationship for reactive power generation. Upon a trigger signal, such as a low voltage event on the grid, a second control mode is implemented wherein the wind turbine generators and STATCOM are switched to a slave-master relationship for reactive power generation.

An improved system and method that operate reactive power compensation devices in a wind farm, or with individual wind turbines, in stable and grid fault states would be desirable in the industry.

BRIEF DESCRIPTION

Aspects and advantages of the invention will be set forth in part in the following description, or may be obvious from the description, or may be learned through practice of the invention.

In one aspect, the present disclosure is directed to a method for operating a power generation system that supplies real and reactive power to a grid, wherein the power generation system includes a generator with a power converter. The method includes determining an amount of reactive power to be supplied by the power generation system (a "reactive power demand") during a first state on the grid (e.g., a non-fault state wherein grid voltage is within a normal range determined by the grid operator). In this first state, a first reactive power portion of the reactive power demand is supplied by the generator system (e.g., by a rotor side converter (RSC) via the generator and a Line Side Converter (LSC)), and a second reactive power portion of the reactive power demand is supplied by a reactive power compensation device. In this first state, the first reactive power portion may be less than the second reactive power portion. Also, the reactive power compensation device may be operating at its maximum capacity so as to increase the real power capacity of the generator.

When a fault occurs on the grid, such as a low or high voltage fault, and a fault ride through (FRT) protocol is initiated for the power generation system, the first reactive power is increased and the second reactive power portion is decreased. In a particular embodiment, the first reactive power portion may be increased to greater than the second reactive power portion during the grid fault state. Also, during the grid fault, the reactive power supply may be greater than during the first grid state.

Upon conclusion of the grid fault, the first reactive power portion is again decreased and the second reactive power portion is again increased. For example, the second reactive power portion may be greater than the first reactive power portion during subsequent stable grid states.

In a particular embodiment of the method, in the first grid state, the reactive power compensation device may be operating at maximum capacity and supplying, for example, 100% of the reactive power demand. Thus, it should be understood that the first reactive power portion may be a 0% portion of the reactive power demand during the first grid state. During the grid fault state, priority for supply of the reactive power demand switches to the generator, which may provide, for example, substantially all of the reactive power demand, wherein the reactive power compensation device may be turned off or otherwise isolated from grid during the grid fault (to protect the device). Thus, it should be understood that the second reactive power portion may be a 0% portion of the reactive power demand during the grid fault state. As mentioned, the total reactive power demand may increase during the grid fault as compared to the first grid state.

In one embodiment, the power generation system is configured as a wind turbine system with a doubly fed induction generator (DFIG).

As discussed above with respect to the method embodiments, during a grid fault, such as a low voltage fault, wherein an FRT protocol is initiated and the reactive power demand is greater than during the stable state, the control system functions such that the first reactive power portion is increased and the second reactive power portion supplied by the reactive power compensation device is decreased. Upon conclusion of the grid fault, the reactive power demand may increase, stay the same, or decrease. In the case, where there is a decrease in reactive power, the first reactive power portion may be decreased and the second reactive power portion may be increased, for example to greater than the first reactive power portion during subsequent stable states on the grid.

In one embodiment of the wind turbine system, the reactive power compensation device is isolated from grid during the grid fault such that all of the reactive power is supplied by the DFIG.

The reactive power compensation device may, in certain embodiments, be any one or combination of a Static VAR compensator (SVC), a Static VAR Generator (SVG) device, or a Static Synchronous Compensator (STATCOM) device.

The present disclosure also encompasses a wind farm that includes a plurality of the wind turbine systems that supply real and reactive power to the grid. The wind turbines may be variously configured and connected within the wind farm, and the present invention is not limited to any particular configuration of the wind turbines within the wind farm. In a particular configuration of the wind farm, all or a plurality of the wind turbines are connected to a common collection bus within the wind farm (e.g., singularly or in a series connected configuration). One or more reactive power compensation devices may be provided separate from the wind turbines and connected to the common collection bus to collectively supply the second reactive power portion allocated to each of the wind turbines directly to the common collection bus. In this embodiment, the control system may include a farm-level controller in communication with the reactive power compensation device and an individual wind turbine controller in communication with the DFIG at each wind turbine.

In another embodiment of the wind farm configuration wherein all or a plurality of the wind turbines are connected to a common collection bus, each of the wind turbines may include an individual reactive power compensation device such that the second reactive power portion is individualized for each wind turbine and supplied to the common collection bus along with the first reactive power portion from the DFIG. In this embodiment, the control system may include a farm-level controller in communication with an individual wind turbine controller at each wind turbine, wherein the wind turbine controller is in communication with the DFIG and the reactive power compensation device at each wind turbine.

The present disclosure also encompasses a power generating system configured to supply real and reactive power to a load, as discussed above.

It should be understood that the methods and systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an embodiment of a wind turbine according to the present disclosure;

FIG. 2 illustrates a schematic view of one embodiment of a wind turbine electrical power system suitable for use with the wind turbine shown in FIG. 1;

FIG. 3 is a schematic diagram of one embodiment of a power converter of a wind turbine according to the present disclosure;

FIG. 4 is a system configuration of a wind farm in accordance with aspects of the present disclosure;

FIG. 5 is a diagram depicting various placement locations of a modular VAR Box in a DFIG system;

FIG. 6 is a system configuration of an alternate embodiment of a wind farm in accordance with aspects of the present disclosure; and FIG. 7 is a flow diagram of one embodiment of a method according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, as discussed above, the present subject matter is directed to a system and method for operating a power generation system having a generator with a power converter, such as a wind turbine with a doubly fed induction generator system (DFIG). The amount of reactive power to be supplied by the power generation system (reactive power demand) during a first state on the grid is determined, wherein this first grid state is a non-fault grid state with grid voltages within a normal range. In the first grid state, a first reactive power portion of the reactive power demand is supplied by the generator, and a second reactive power portion of the reactive power demand is supplied by a reactive power compensation device, wherein the first reactive power portion is less than the second reactive power portion. Also, in the first grid state, the reactive power compensation device may be operating at its maximum capacity so as to increase the real power capacity of the generator. When a fault occurs on the grid, such as a low voltage fault, and a fault ride through (FRT) protocol is initiated for the power generation system, the first reactive power portion supplied by the generator is increased and the second reactive power supplied by the reactive power compensation device is decreased such that the first reactive power portion is greater than the second reactive power portion during the grid fault state. The total reactive power demand made on the power generation system during the fault may be greater than during the first or stable grid state. Upon conclusion of the grid fault, the first reactive power portion from the generator is again decreased and the second reactive power portion from the reactive power compensation device is again increased, wherein the second reactive power portion is again greater than the first reactive power portion of the reactive power demand during subsequent stable grid states.

Although not limited to such configurations, for ease of explanation, the present method and system are described herein with reference to a wind turbine power generating system, and more particularly to a wind turbine DFIG system that supplies real and reactive power to a grid.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy.

Wind power generation is typically provided by a wind farm having a large number (often 100 or more) of the wind turbines 10 with associated wind turbine generators 120 (FIG. 2), wherein each individual wind turbine 10 typically experiences a unique wind force. Accordingly, the output power for each individual wind turbine generator 120 may vary from one wind turbine 10 to another wind turbine 10 within the wind farm.

As is generally understood, active power (P) and reactive power (Q) are provided by each wind turbine generator 120. In some embodiments, a farm-level controller provides reactive power commands (Qcmd) to the wind turbine generators 120, based on transmission grid needs (which may be dictated by the grid operator or determined based on grid voltage). The reactive power demand may be identical for each wind turbine generator. In an alternate control methodology, the reactive power commands may be individually tailored to the wind turbine generators 120 in the wind farm based on the different power generation characteristics of the respective wind turbine generators 120, as described, for example in US Pat. Pub. No. 2015/0295529. It should be appreciated that the present invention is not limited to the manner or methodology in which the reactive power command for an individual wind turbine generator 120 is generated.

Referring now to FIG. 2, a schematic diagram of one embodiment of a wind turbine DFIG power system 100 ("wind turbine system") is illustrated in accordance with aspects of the present subject matter. Although the present subject matter will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gear box 118, which is, in turn, coupled to the generator 120, which may be a doubly fed induction generator (DFIG).

As shown, the DFIG 120 is connected to a stator bus 154. A power converter is connected to the DFIG 120 via a rotor bus 156, and to the stator bus 154 via a line side bus 188. The stator bus 154 provides an output multiphase power (e.g. three-phase power) from a stator of the DFIG 120, and the rotor bus 156 provides an output multiphase power (e.g. three-phase power) from a rotor of the DFIG 120. The power converter 162 includes a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 is coupled to a controller 174 in order to control the operation of the rotor side converter 166 and the line side converter 168. It should be noted that the converter controller 174 may be configured as an interface between the power converter 162 and a local wind turbine control system 176 and include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

As mentioned, for an individual DFIG wind turbine power system 100, the reactive power (Q) is supplied primarily by the RSC, via the generator 120 and the LSC.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at or near its synchronous speed). Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at hub 20 and blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor. More specifically, electrical power is transmitted from the stator bus 154 to line side bus 188 and subsequently through the line contactor 172 and into the power converter 162, specifically the LSC 168 which acts as a rectifier and rectifies the sinusoidal, three-phase AC power to DC power. The DC power is transmitted into DC link 136. Capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power with predetermined voltages, currents, and frequencies. This conversion is monitored and controlled via converter controller 174. The converted AC power is transmitted from RSC 166 via rotor bus 156 to the generator rotor. In this manner, generator reactive power control is facilitated by controlling rotor current and voltage.

Referring now to FIG. 3, a schematic diagram of one embodiment of the power converter shown in FIG. 2 is illustrated in accordance with aspects of the present subject matter. As shown, the rotor side converter (RSC) 166 includes a plurality of bridge circuits (e.g. H-bridge circuits), with each phase of the rotor bus 156 input to the rotor side converter 166 being coupled to a single bridge circuit. In addition, the line side converter (LSC) 168 may also include a plurality of bridge circuits. Similar to the rotor side converter 166, the line side converter 168 also includes a single bridge circuit for each output phase of the line side converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

Referring generally to FIG. 4, is a block diagram of a wind farm 175 having multiple wind turbine systems 100 coupled with a transmission grid 184. Each wind turbine system 100 includes a local controller 176 that is responsive to the states of the wind turbine generator being controlled. In one embodiment, the local controller 176 senses only the terminal voltage and current (via potential and current transformers), which are used by the local controller 176 to provide an appropriate response to cause the wind turbine generator to provide the desired reactive power or power factor and voltage.

Each wind turbine system 100 is coupled to collector bus 178 through a generator connection transformer 180 to provide real and reactive power (labeled Pwg and Qwg, respectively) to the collector bus 178. Generator connection transformers and collector buses are known in the art.

The wind farm 175 provides farm-level real and reactive power output (labeled Pwf and Qwf, respectively) via wind farm main transformer 179. A farm level controller 190 senses the wind farm output as well as the voltage at a point of common coupling 181 with the grid 184 to provide a farm level reactive power command (Farm-Level Q_Cmd).

A local reactive power command (Operator Q_Cmd) is generated and transmitted to each individual wind turbine system 100 in the wind farm. In one embodiment, the total reactive power demand (Qwf) placed on the wind farm 175 may be essentially equally divided between the wind turbine systems 100 such that the local Operator Q_Cmd command is the same for all of the wind turbine systems 100. In an alternate embodiment, the local Operator Q_Cmd command may be based on an available reactive power value for that wind turbine generator. For example, individual wind turbine generators that are providing relatively more real power (Pwg) may receive relatively smaller individualized Operator Q_Cmd commands, and individual wind turbine generators that are providing relatively less real power Pwg may receive relatively larger individualized Operator Q_Cmd commands. This reduces curtailment of individual wind turbine generators that are providing relatively more real power, thus increasing the real power (Pwf) produced by the wind farm relative to increased farm level reactive power commands (Qwf).

It should be appreciated that the converter controllers 174, local wind turbine controllers 176, and farm level controller 190 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

In the embodiment depicted in FIG. 4, each wind turbine system 100 is configured with an individual reactive power compensation device 200 (also referred to as a modular VAR Box (MVB) herein) such that the second reactive power portion of the reactive power demand (Operator Q_Cmd), which is generated by the reactive power device 200, is individualized for each wind turbine and is supplied to the common collection 178 bus along with the first reactive power portion generated by the generator (by the LSC and the RSC via the generator 120). In this embodiment, the local controller 176 may receive the Operator Q_Cmd from the farm-level controller 190 and apportion the first and second reactive power portions according to the method discussed above for stable states on the grid 184. For example, the local controller 176 may generate an MVB command (Qmvb) corresponding to the second reactive power portion and transmit this command to the reactive power compensation device 200 (e.g., to a controller associated with the device 200). At the same time, the local controller 176 may generate a "generator reactive power command" corresponding to the first reactive power portion of the reactive power demand and transmit this signal to the power converter controller 174 (FIG. 2).

For grid fault states, the local controller 176 may also generate (Qmvb). Alternatively, the MVB device 200 may be configured with its own controller that is capable of detecting the grid fault state and generating (Qmvb) directly, which can significantly improve the reaction time of the system to a grid fault.

FIG. 5 is a diagram that depicts various operational locations for integration of the reactive power compensation device 200 locally with an individual wind turbine system 100. The dashed line "A" indicates that the reactive power compensation device 200 is connected to the line side bus 188 between the LSC 168 and three-way transformer 202. In the diagram, transformer 180 may be a substation transformer at the point of interconnection (POI) with the grid. The dashed line "B" indicates that the reactive power compensation device 200 may be connected (via a transformer 204) to a bus 155 downstream of the grid breaker 182 (but in close proximity to the wind turbine system 100) or between the grid breaker 182 and the three-way transformer 202. It should be appreciated that the present subject matter is not limited to the integration locations depicted in FIG. 5, and that other suitable locations may be determined by those skilled in the art.

FIG. 6 depicts an alternate embodiment of the wind farm 175 wherein a common reactive power compensation device 200 is in communication with the collector bus 178. Thus, in this embodiment, the farm-level controller 190 computes a total (Qmvb) reactive power for the reactive power compensation device 200 that corresponds to the collective amount of the "second reactive power portions" for all of the wind turbine systems 100, which may be the same or vary between different systems based on different capacities of the individual respective systems 100. The second reactive power portion is contributed directly to the collector bus 178 by the common reactive power compensation device 200. An Operator Q_Cmd demand is still transmitted to the local controller 176 at each wind turbine system 100, which corresponds to the first reactive power portion that must be generated by the generator for the different stable and fault states of the grid.

Referring now to FIG. 7, a flow diagram of an embodiment of a method 300 for operating a power generation system is illustrated in accordance with aspects of the present subject matter. In general, the method 300 is described herein as implemented using a wind turbine system 100, such as the DFIG wind turbine power system 100 described above. However, it should be appreciated that the disclosed method 300 may be implemented using any other suitable power generation system that is configured to supply power, including reactive power, for application to a load, such as a power grid. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (302), the method 300 includes determining the reactive power demand made on the power generation system at a first state on the grid. As set forth above, this may be a non-fault state wherein grid voltage at the point of common connection with the wind turbine system is within a normal range, which may be determined by the grid operator.

At (304), a first reactive power portion of the reactive power demand is determined and supplied by generator and power converter, as described above.

At (306), a second reactive power portion of the reactive power demand is determined and supplied by a reactive power compensation device configured locally with the power generation system or common to a plurality of the power generation systems. In certain embodiments, the first reactive power portion may be less than the second reactive power portion during the first grid state. The full capacity of the reactive power compensation device may be used to supply the second reactive power portion during the first grid state, and may correspond to essentially all of the reactive power demand during the first grid state, wherein the first reactive power portion is essentially zero and the full capacity of the power converter to generate real power is utilized.

At (308), a grid fault is detected, such as a low voltage, zero voltage, or high voltage state, which results in initiation of a FRT protocol (e.g., a LVRT or ZVRT protocol) at the power generation system.

At (310), in the event that a grid fault is detected, a FRT protocol is initiated wherein the first reactive power portion generated by the generator/power converter is increased and the second reactive power portion generated by the reactive power compensation device is decreased. For example, the second reactive power portion may be decreased to zero and the reactive power compensation device may be turned off or otherwise isolated from the grid. The reactive power demand made on the power generation system during the grid fault may be greater than during the stable states on the grid. Thus, in certain embodiments, the increase in the first reactive power portion is greater than the decrease in the second reactive power portion during the grid fault to account for the increased reactive power demand made on the power generation system during the fault.

At (312), the grid is monitored to determine when the fault is over or dissipated to a non-fault state.

At (314), in the event that the grid fault has been cleared and a stable state restored to the grid, the first reactive power portion is again decreased and the second reactive power portion is again increased. The portions may return to the pre-fault levels or new levels wherein the second reactive power portion is greater than the first reactive power portion.

Various aspects and embodiments of the present invention are defined by the following numbered clauses:

1. A method for operating a power generation system that supplies real and reactive power to a grid, the power generation system including a generator with a power converter, the method comprising:
   determining a reactive power demand made on the power generation system during a first grid state;
   supplying a first reactive power portion of the reactive power demand during the first grid state with the generator, and supplying a second reactive power portion of the reactive power demand during the first grid state with a reactive power compensation device;
   upon detection of a grid fault, increasing the first reactive power portion and decreasing the second reactive power portion; and
   upon conclusion of the grid fault, decreasing the first reactive power portion and increasing the second reactive power portion.

2. The method as in clause 1, wherein the second reactive power portion is greater than the first reactive power portion during the first grid state, and during the grid fault, the first reactive power portion is greater than the second reactive power portion.

3. The method as in any preceding clause, wherein during the grid fault, the first reactive power portion is substantially all of the reactive power demand, and the reactive power compensation device is isolated from grid during the grid fault.

4. The method as in any preceding clause, wherein upon the conclusion of the grid fault, the second reactive power portion is again greater than the first reactive power portion.

5. The method as in any preceding clause, wherein the first reactive power portion and the second reactive power portion during the grid fault are determined based on a severity of the grid fault.

6. The method as in any preceding clause, wherein the power generation system comprises a wind turbine with a doubly fed induction generator (DFIG), the wind turbine being one of a plurality of wind turbines within a wind farm that supplies real and reactive power to the grid.

7. The method as in any preceding clause, wherein all or a plurality of the wind turbines are connected to a common collection bus within the wind farm, the reactive power compensation device connected to the common collection bus to supply the second reactive power portion allocated to each of the wind turbines directly to the common collection bus.

8. The method as in any preceding clause, wherein all or a plurality of the wind turbines are connected to a common collection bus, each of the wind turbines comprising an individual reactive power compensation device such that the second reactive power portion is individualized for each wind turbine and supplied to the common collection bus along with the first reactive power portion.

9. A wind turbine system configured to supply real and reactive power to a grid, comprising:
   a wind turbine with a rotor, hub, and a plurality of blades coupled to the hub;
   a doubly fed induction generator (DFIG) coupled to the rotor, the DFIG further comprising a power converter configured to generate a first reactive power portion of a reactive power demand made on the wind turbine system;
   a reactive power compensation device configured to generate a second reactive power portion of the reactive power demand;

a control system controlling operation of the DFIG and the reactive power compensation device such that:

in a first grid state, the second reactive power portion is greater than the first reactive power portion;

during a grid fault wherein the reactive power demand is increased, the first reactive power portion is increased and the second reactive power portion is decreased; and upon conclusion of the grid fault wherein the reactive power demand is decreased, the first reactive power portion is decreased and the second reactive power portion is increased.

10. The wind turbine system as in clause 9, wherein the control system is configured such that the second reactive power portion is greater than the first reactive power portion during the first grid state, and during the grid fault, the first reactive power portion is greater than the second reactive power portion.

11. The wind turbine system as in any one of clauses 9-10, wherein the control system is configured such that during the grid fault, the first reactive power portion is substantially all of the reactive power demand, and the reactive power compensation device is isolated from grid during the grid fault.

12. The wind turbine system as in any one of clauses 9-11, wherein the control system is configured such that the first reactive power portion and the second reactive power portion during the grid fault are determined based on a severity of the grid fault.

13. The wind turbine system as in any one of clauses 9-12, wherein the reactive power compensation device comprises any one or combination of a Static VAR compensator (SVC), a Static VAR Generator (SVG) device, or a Static Synchronous Compensator (STATCOM) device.

14. The wind turbine system as in any one of clauses 9-13, wherein the wind turbine system is one of a plurality of the wind turbine systems within a wind farm that supplies farm-level real and reactive power to the grid; and wherein all or a plurality of the wind turbine systems are connected to a common collection bus within the wind farm, the reactive power compensation device connected to the common collection bus to supply the second reactive power portion allocated to each of the wind turbine systems directly to the common collection bus.

15. The wind turbine system as in any one of clauses 9-14, wherein the control system comprises an individual wind turbine controller in communication with the DFIG and a farm-level controller in communication with the reactive power compensation device.

16. The wind turbine system as in any one of clauses 9-15, wherein the wind turbine system is one of a plurality of the wind turbine systems within a wind farm that supplies farm-level real and reactive power to the grid; and wherein all or a plurality of the wind turbine systems are connected to a common collection bus within the wind farm, the reactive power compensation configured individually with the wind turbine system such that the second reactive power portion is individualized for the wind turbine system and supplied to the common collection bus along with the first reactive power portion.

17. The wind turbine system as in any one of clauses 9-16, wherein the control system comprises an individual wind turbine controller in communication with the DFIG and the reactive power compensation device, and a farm-level controller in communication with the wind turbine controller.

18. A power generating system configured to supply real and reactive power to a load, comprising:

a generator with a power converter configured to generate a first reactive power portion of a reactive power demand made on the power generating system, the power converter further comprising a plurality of switching elements;

a reactive power compensation device configured to generate a second reactive power portion of the reactive power demand;

a control system controlling operation of the power converter and the reactive power compensation device such that:

in a first load state, the second reactive power portion is greater than the first reactive power portion;

during a load fault state wherein the reactive power demand is increased, the first reactive power portion is increased and the second reactive power portion is decreased such that the first reactive power portion is greater than the second reactive power portion during the load fault state; and upon conclusion of the load fault state wherein the reactive power demand is decreased, the first reactive power portion is decreased and the second reactive power portion is increased to greater than the first reactive power portion.

19. The power generating system as in clause 18, wherein the reactive power compensation device is individually configured with the generator such that the second reactive power portion is individualized for the power generating system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power generation system that supplies real and reactive power to a grid, the power generation system including a generator with a power converter, the method comprising:

determining a reactive power demand made on the power generation system during a first grid state;

supplying a first reactive power portion of the reactive power demand during the first grid state with the generator, and supplying a second reactive power portion of the reactive power demand during the first grid state with a reactive power compensation device;

upon detection of a grid fault, increasing the first reactive power portion and decreasing the second reactive power portion; and upon conclusion of the grid fault, decreasing the first reactive power portion and increasing the second reactive power portion.

2. The method as in claim 1, wherein the second reactive power portion is greater than the first reactive power portion during the first grid state, and during the grid fault, the first reactive power portion is greater than the second reactive power portion.

3. The method as in claim 2, wherein during the grid fault, the first reactive power portion is substantially all of the reactive power demand, and the reactive power compensation device is isolated from grid during the grid fault.

4. The method as in claim 1, wherein upon the conclusion of the grid fault, the second reactive power portion is again greater than the first reactive power portion.

5. The method as in claim 1, wherein the first reactive power portion and the second reactive power portion during the grid fault are determined based on a severity of the grid fault.

6. The method as in claim 1, wherein the power generation system comprises a wind turbine with a doubly fed induction generator (DFIG), the wind turbine being one of a plurality of wind turbines within a wind farm that supplies real and reactive power to the grid.

7. The method as in claim 6, wherein all or a plurality of the wind turbines are connected to a common collection bus within the wind farm, the reactive power compensation device connected to the common collection bus to supply the second reactive power portion allocated to each of the wind turbines directly to the common collection bus.

8. The method as in claim 6, wherein all or a plurality of the wind turbines are connected to a common collection bus, each of the wind turbines comprising an individual reactive power compensation device such that the second reactive power portion is individualized for each wind turbine and supplied to the common collection bus along with the first reactive power portion.

9. A wind turbine system configured to supply real and reactive power to a grid, comprising:
a wind turbine with a rotor, hub, and a plurality of blades coupled to the hub;
a doubly fed induction generator (DFIG) coupled to the rotor, the DFIG further comprising a power converter configured to generate a first reactive power portion of a reactive power demand made on the wind turbine system;
a reactive power compensation device configured to generate a second reactive power portion of the reactive power demand;
a control system controlling operation of the DFIG and the reactive power compensation device such that:
in a first grid state, the second reactive power portion is greater than the first reactive power portion;
during a grid fault wherein the reactive power demand is increased, the first reactive power portion is increased and the second reactive power portion is decreased; and
upon conclusion of the grid fault wherein the reactive power demand is decreased, the first reactive power portion is decreased and the second reactive power portion is increased.

10. The wind turbine system as in claim 9, wherein the control system is configured such that the second reactive power portion is greater than the first reactive power portion during the first grid state, and during the grid fault, the first reactive power portion is greater than the second reactive power portion.

11. The wind turbine system as in claim 10, wherein the control system is configured such that during the grid fault, the first reactive power portion is substantially all of the reactive power demand, and the reactive power compensation device is isolated from grid during the grid fault.

12. The wind turbine system as in claim 9, wherein the control system is configured such that the first reactive power portion and the second reactive power portion during the grid fault are determined based on a severity of the grid fault.

13. The wind turbine system as in claim 9, wherein the reactive power compensation device comprises any one or combination of a Static VAR compensator (SVC), a Static VAR Generator (SVG) device, or a Static Synchronous Compensator (STATCOM) device.

14. The wind turbine system as in claim 9, wherein the wind turbine system is one of a plurality of the wind turbine systems within a wind farm that supplies farm-level real and reactive power to the grid; and wherein all or a plurality of the wind turbine systems are connected to a common collection bus within the wind farm, the reactive power compensation device connected to the common collection bus to supply the second reactive power portion allocated to each of the wind turbine systems directly to the common collection bus.

15. The wind turbine system as in claim 14, wherein the control system comprises an individual wind turbine controller in communication with the DFIG and a farm-level controller in communication with the reactive power compensation device.

16. The wind turbine system as in claim 9, wherein the wind turbine system is one of a plurality of the wind turbine systems within a wind farm that supplies farm-level real and reactive power to the grid; and wherein all or a plurality of the wind turbine systems are connected to a common collection bus within the wind farm, the reactive power compensation configured individually with the wind turbine system such that the second reactive power portion is individualized for the wind turbine system and supplied to the common collection bus along with the first reactive power portion.

17. The wind turbine system as in claim 16, wherein the control system comprises an individual wind turbine controller in communication with the DFIG and the reactive power compensation device, and a farm-level controller in communication with the wind turbine controller.

18. A power generating system configured to supply real and reactive power to a load, comprising:
a generator with a power converter configured to generate a first reactive power portion of a reactive power demand made on the power generating system, the power converter further comprising a plurality of switching elements;
a reactive power compensation device configured to generate a second reactive power portion of the reactive power demand;
a control system controlling operation of the power converter and the reactive power compensation device such that:
in a first load state, the second reactive power portion is greater than the first reactive power portion;
during a load fault state wherein the reactive power demand is increased, the first reactive power portion is increased and the second reactive power portion is decreased such that the first reactive power portion is greater than the second reactive power portion during the load fault state; and
upon conclusion of the load fault state wherein the reactive power demand is decreased, the first reactive power portion is decreased and the second reactive power portion is increased to greater than the first reactive power portion.

19. The power generating system as in claim 18, wherein the reactive power compensation device is individually configured with the generator such that the second reactive power portion is individualized for the power generating system.

* * * * *